United States Patent [19]

Ozu et al.

[11] Patent Number: 4,746,576

[45] Date of Patent: May 24, 1988

[54] WRITING SCREEN

[75] Inventors: Takahiro Ozu; Keizo Abe; Masayoshi Tsujii, all of Yokkaichi, Japan

[73] Assignee: Mitsubishi Petrochemical Company Limited, Tokyo, Japan

[21] Appl. No.: 945,852

[22] Filed: Dec. 23, 1986

[30] Foreign Application Priority Data

Dec. 25, 1985 [JP] Japan .............................. 60-296497

[51] Int. Cl.[4] .............................................. B32B 27/06

[52] U.S. Cl. .................................. 428/421; 428/207; 428/422

[58] Field of Search ........................ 428/421, 422, 207

[56] References Cited

U.S. PATENT DOCUMENTS

| | | | |
|---|---|---|---|
| 3,922,457 | 11/1975 | Barnwell et al. | 428/421 |
| 4,335,238 | 6/1982 | Moore et al. | 428/421 X |
| 4,563,393 | 1/1986 | Kitagawa et al. | 428/422 X |
| 4,615,943 | 10/1986 | Sakagami et al. | 428/422 X |

*Primary Examiner*—Thomas J. Herbert
*Attorney, Agent, or Firm*—Oblon, Fisher, Spivak, McClelland & Maier

[57] ABSTRACT

A writing screen comprising a substrate and an overlayer on the surface thereof of a film comprising a vinylidene fluoride copolymer resin having a ratio of the existing amount of fluorine atoms (F) and that of carbon atoms (C), F/C, on the surface in the range of 0.6 to 1.5. The screen has excellent marker suitability and resistance to surface damage.

2 Claims, No Drawings

WRITING SCREEN

BACKGROUND OF THE INVENTION

This invention relates to a writing screen which is a film having an advantage in that it may be formed easily and comprising a specific vinylidene fluoride copolymer resin and has excellent marker suitability (ink affinity and erasability for ink) and resistance to surface damage.

Recently, there have been marketed writing boards (white boards) on which writing is carried out with a marker. There have also been developed articles which are, for example, in combination with an electronic duplicating function and are distinguished from conventional black boards on which writing is conducted with chalks. These white boards are now expected to undergo still more development with improvement and modification.

The surface overlaying films of these white boards are required to have marker suitability, that is, a property whereby ink spreads homogeneously without blotting or repelling of ink (ink drapeability) and ink writing can be easily and completely erased with an eraser (ink erasability). Therefore ethylene-tetrafluoroethylene copolymers have conventionally been used.

However, an ethylene-tetrafluoroethylene copolymer has a narrow temperature range in which it can be molded because of its high melting temperature and needs a special molding process for use, which makes its handling complicated and thus uneconomical. Moreover, it tends to be scratched and otherwise damaged because of its softness.

An object of this invention is to provide a screen which can be formed with a film obtained by a simple molding process and is economical.

Another object of this invention is to provide a screen which is damage resistant and has excellent marker suitability.

We have conducted a variety of researches with respect to resins which have low melting points and can easily be molded for the purpose of improving the aforementioned points.

However, sufficient marker suitability was not obtained by simply applying a low melting resin. No improvement was observed even in a blend of a high melting resin and a low melting resin.

SUMMARY OF THE INVENTION

This invention is based on the finding that only a specific fluorine resin having a fluorine atom content on the surface of the aforementioned film within a certain range can solve the aforementioned problems and can be easily molded into films with excellent marker suitability.

In other words, this invention provides a writing screen characterized in that the surface of the screen is overlaid with a film comprising a vinylidene fluoride copolymer resin having a ratio of the existing amount of fluorine atoms (F) and that of carbon atoms (C), F/C, on the surface in the range of 0.6 to 1.5, which ratio is measured by X-ray photoelectron spectroscopy.

DETAILED DESCRIPTION

Examples of vinylidene fluoride copolymer resins suitable for use in this invention are copolymer resins each of which comprises vinylidene fluoride (VDF) in a weight ratio of half or more, the balance including fluorine monomers such as tetrafluoroethylene (TFE), hexafluoropropylene (HFP) or the like and other monomers such as ethylene, propylene or the like as optional components.

Among these, VDF-HFP copolymers, VDF-TFE copolymers and VDF-TFE-HFP copolymers are preferred, and particularly VDF-HFP copolymers having an HFP content of 5 to 30% by weight, VDF-TFE copolymers having a TFE content of 7 to 30% by weight and VDF-TFE-HFP copolymers having TFE and HFP contents of 10 to 40% by weight are preferred.

These copolymer resins can be used in combination, and any other resin having a compatibility which will not significantly cause deterioration of the quality of the film formed (surface roughening, peeling of phases, etc.) can also be incorporated in these copolymer resins as an additional component.

As the additional component, a component which is incorporated for controlling the existing amount of fluorine atoms on the surface of the film formed is particularly worthy of attention. For example, a vinylidene fluoride copolymer having an F/C ratio apart from the aforementioned range is blended with the additional component for adjusting the F/C ratio to that within the aforementioned range, and the copolymer thus adjusted can be used for the film according to this invention.

Examples of such an additional component are fluorine oligomers such as a VDF-HFP copolymer and the like; fluorine surface active agents such as $C_8F_{17}COONH_4$ and the like; fluorine elastomers such as a VDF-HFP copolymer, a VDF-TFE-HFP copolymer and the like; fluorine resins such as a tetrafluoroethylene-hexafluoropropylene copolymer, a tetrafluoroethylene-perfluoroalkylvinyl ether copolymer, an ethylene-tetrafluoroethylene copolymer and the like.

The amount incorporated is generally in the range of 0.01 to 45% by weight. The preferable amount incorporated is 0.01 to 3% by weight for liquids such as oligomers, surface active agents or the like in consideration of surface bleeding and 1 to 30% by weight for solids such as elastomers, resins and the like.

Among the copolymer resins used for the film, only those having the aforementioned F/C ratio in the range of 0.6 to 1.5, preferably 0.7 to 1.0 are suitable for this invention. If the resin has an F/C ratio less than the range, it is inferior in ink erasability. If the resin has an F/C ratio exceeding the range, it has poor ink suitability.

The F/C ratio may be often changed depending on the molding conditions, post-treatments after molding and other factors, even if the same copolymers are used.

The film according to this invention is formed by any suitable conventional molding or coating method. That is to say, for example, it is molded by the T-die molding method, the inflation molding method or the like at a standard molding temperature between 200° and 280° C., or coated by emulsion coating.

The film molded from the vinylidene copolymer may be subjected to uniaxial or biaxial orientation as secondary processing or may be subjected to annealing treatment, if necessary.

The films of this invention prepared by the aforementioned processing are used as overlayer on the surfaces of plate materials such as wood, metal or the like or sheet materials such as fabric, synthetic resin, paper or the like. The film has generally a thickness in the range of 5 to 50μ.

The screens thus formed are used for white boards, electronic black boards or the like.

This invention will now be described in greater detail by way of Examples.

EXAMPLES

The results of evaluating the suitability of various films listed in Table 1 below for a commercially available marker for writing boards are shown in Table 1.

TABLE 1(a)

| Experimental No. | Resin | Ratio of existing amount of atoms on the surface F | C | F/C | Ink affinity Marker A Black | Red | Blue | Marker B Black | Red | Marker C Black |
|---|---|---|---|---|---|---|---|---|---|---|
| 1 | PVF | 0.29 | 0.71 | 0.41 | o | o | o | o | o | o |
| 2 | PVDF | 0.39 | 0.61 | 0.50 | o | o | o | o | o | o |
| 3 | FEP | 0.62 | 0.38 | 1.63 | x | x | x | x | x | x |
| 4 | PFA | 0.61 | 0.38 | 1.61 | x | x | x | x | x | x |
| 5 | ETFE | 0.44 | 0.56 | 0.79 | o | o | o | o | o | o |
| 6 | VDF-HFP | 0.41 | 0.77 | 0.53 | o | o | o | o | o | o |
| 7 | VDF-HFP | 0.42 | 0.67 | 0.63 | o | o | o | o | o | o |
| 8 | VDF-HFP | 0.43 | 0.57 | 0.75 | o | o | o | o | o | o |
| 9 | VDF-HFP | 0.50 | 0.42 | 1.19 | o | o | o | o | o | o |
| 10 | VDF-HFP | 0.55 | 0.39 | 1.41 | o | o | o | o | o | o |
| 11 | VDF-HFP | 0.63 | 0.30 | 1.62 | x | x | x | x | x | x |
| 12 | VDF-TFE | 0.42 | 0.76 | 0.55 | o | o | o | o | o | o |
| 13 | VDF-TFE | 0.45 | 0.64 | 0.70 | o | o | o | o | o | o |
| 14 | VDF-TFE | 0.58 | 0.40 | 1.45 | o | o | o | o | o | o |
| 15 | VDF-TFE | 0.65 | 0.39 | 1.67 | x | x | x | x | x | x |

TABLE 1(b)

| Experimental No. | Ink erasability Marker A Black | Red | Blue | Marker B Black | Red | Marker C Black | Resistance to surface damage |
|---|---|---|---|---|---|---|---|
| 1 | x | x | x | x | x | x | poor |
| 2 | x | x | x | x | x | x | good |
| 3 | o | o | o | o | o | o | poor |
| 4 | o | o | o | o | o | o | poor |
| 5 | o | o | o | o | o | o | poor |
| 6 | x | x | x | x | x | x | good |
| 7 | o | o | o | o | o | o | good |
| 8 | o | o | o | o | o | o | good |
| 9 | o | o | o | o | o | o | good |
| 10 | o | o | o | o | o | o | good |
| 11 | o | o | o | o | o | o | good |
| 12 | x | x | x | x | x | x | good |
| 13 | o | o | o | o | o | o | good |
| 14 | o | o | o | o | o | o | good |
| 15 | o | o | o | o | o | o | good |

Note:
Marker A: Marker for white boards, manufactured by Pilot Pen Co., Ltd.,
Marker B: Marker for white boards, manufactured by SAKURA Co., Ltd.,
Marker C: Marker for white boards, manufactured by KOKUYO Co., Ltd.

The resins set forth in Table 1 are represented therein by the following abbreviations.

PVF: Polyvinylfluoride (manufactured by Du Pont, "TEDLAR"),

PVDF: Polyvinylidene fluoride (experimental material),

FEP: Tetrafluoroethylene-hexafluoropropylene copolymer (manufactured by Toray Industries, Inc., "TOYOFLON"), PFA: Tetrafluoroethylene-perfluoroalkyl vinyl ether copolymer (manufactured by Toray Industries, Inc., "TOYOFLON"), ETFE: Ethylene-tetrafluoroethylene copolymer (manufactured by Asahi Glass Co., Ltd., "AFLEX"), VDF-HFP: Vinylidene fluoride-hexafluoropropylene copolymer (experimental material), and VDF-TFE: Vinylidene fluoride-tetrafluoroethylene copolymer (experimental material).

In the table, as the resin in Experimental No. 11, a resin prepared by adding to the resin in Experimental No. 8 30% by weight of a VDF-HFP copolymer elastomer (manufactured by SUMITOMO 3M, "DYNAMER LJ") was used. In Experimental No. 14, a resin prepared by adding to the resin in experimental No. 13 30% by weight of a tetrafluoroethylene-perfluoroalkyl vinyl ether copolymer resin (manufactured by DAIKIN, "NEOFLON NC 2000"), and 3% by weight of a VDF-HFP copolymer oligomer (manufactured by Asahi Glass Co., Ltd., "SAFLON SC 105") was used. In Experimental No. 15, the same resin as that used in Experimental No. 14 except that the amount of "NEOFLON NC 2000" added was 40% by weight was used.

With respect to Experimental Nos. 11, 14 and 15, a film having a thickness of 25μ was prepared for evaluation by molding with a uniaxial extruder (resin temperature: 280° C.) having a diameter of 60 mm and an L/D value of 24 a product which had preliminarily been kneaded with a biaxial extruder (resin temperature: 280° C.) having a diameter of 30 mm.

Relative to Experimental Nos. 2 and 6 to 15, a film having a thickness of 25μ was prepared for evaluation by molding with a uniaxial extruder (230° C.) having a diameter of 65 mm and an L/D value of 24.

With respect to the other films, commercially available films having a thickness equal to or approximately equal to 25μ were used for evaluation.

As the method for evaluation, these films were respectively applied as overlayer on a flat plywood laminate by using an adhesive, and tests for marker suitability were conducted.

The ratio of the existing amount of fluorine atoms (F) and that of carbon atoms (C) was measured with an X-ray photoelectron spectroscopy (XPS), X-SAM 800 model, manufactured by KRATOS (USA).

As for marker suitability, if ink was not repelled or blotted upon writing on a film using commercially available markers shown in Table 1, the ink affinity was evaluated good (O). On the other hand, if ink affinity was evaluated poor, it was expressed by the symbol (x). If ink could be wiped off by wiping lightly a few times, ink erasability was evaluated good (O). If the ink could not be wiped off, the erasability was evaluated poor (x).

As for resistance to surface damage, a pencil scratching test apparatus was modified, and a 100 yen coin was set at the pencil-setting part. The side milled portion of the coin was brushed on each test piece (plywood laminate coated with the film) having a dimension of 35 mm×50 mm×2 mm by applying a load of 2,500 g. A test piece having no trace of abrasion and showing complete recovery was evaluated good, while a test piece having some trace of abrasion was evaluated poor.

What is claimed is:

1. A writing screen, on which writing with a marker and erasing an ink of the marker with an eraser can be carried out, comprising a substrate structure and an overlayer on the surface thereof of a film comprising a vinylidene fluoride copolymer resin having a ratio of the existing amount of fluorine atoms (F) and that of carbon atoms (C), F/C, on the surface in the range of 0.7 to 1.5, which ratio is measured by X-ray photoelectron spectroscopy, which copolymer resin consists of 95 to 70% by weight of vinylidene fluoride and 5 to 30% by weight of hexafluoropropylene, said film being produced by melt molding.

2. A writing screen according to claim 1 wherein the copolymer resin has an F/C in the range of 0.7 to 1.0.

* * * * *